O. C. K. HUTCHINSON.
APPARATUS FOR TESTING GLASS CONTAINERS.
APPLICATION FILED JUNE 4, 1921.
1,427,817.
Patented Sept. 5, 1922.
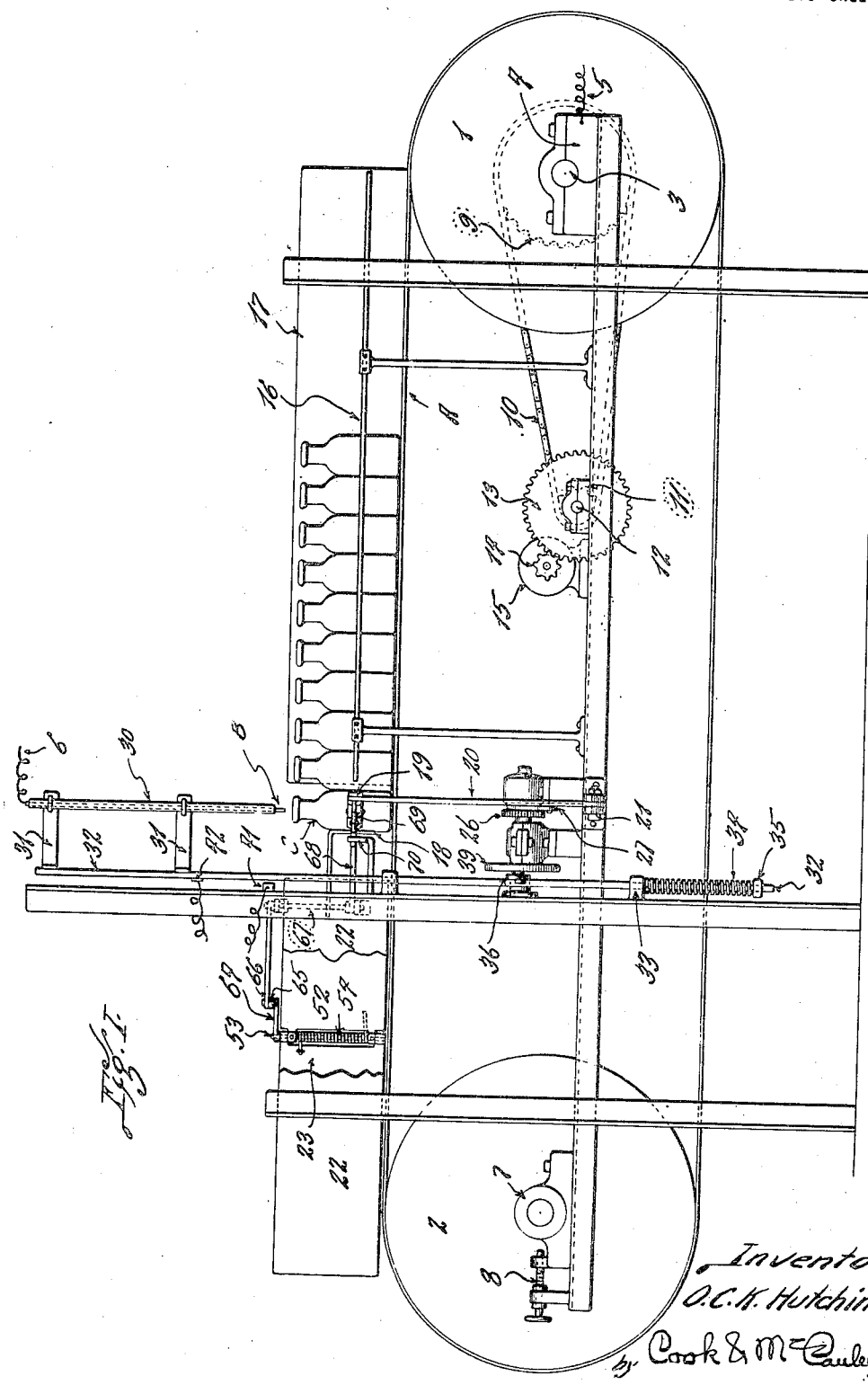
Inventor
O. C. K. Hutchinson
by Cook & McCauley Attys

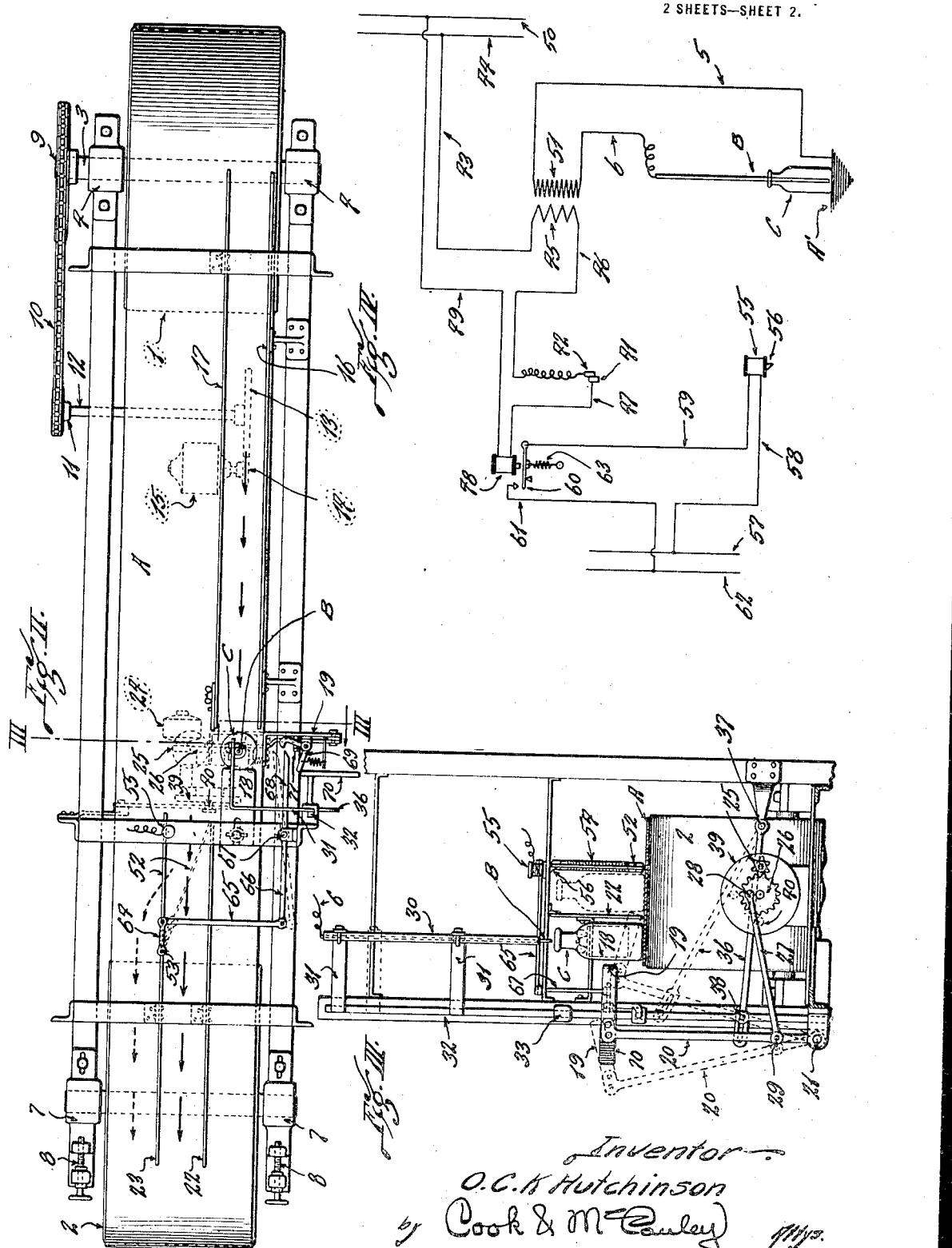

Patented Sept. 5, 1922.

1,427,817

UNITED STATES PATENT OFFICE.

OLIVER C. K. HUTCHINSON, OF ALTON, ILLINOIS, ASSIGNOR TO ILLINOIS GLASS COMPANY, OF ALTON, ILLINOIS, A CORPORATION OF ILLINOIS.

APPARATUS FOR TESTING GLASS CONTAINERS.

Application filed June 4, 1921. Serial No. 475,085.

*To all whom it may concern:*

Be it known that I, OLIVER C. K. HUTCHINSON, a citizen of the United States of America, a resident of Alton, in the county of Madison, State of Illinois, have invented certain new and useful Improvements in Apparatus for Testing Glass Containers, of which the following is a full, clear, and exact description, reference being had to the accompanying drawings, forming a part of this specification.

This invention relates to an apparatus for testing glass containers and the like, one of the objects being to provide a simple and highly efficient testing means adapted to detect tiny pin holes and minute checks or cracks in glass bottles and similar containers. A further object is to automatically separate the defective containers from the others.

Prior to this invention, glass containers have been examined by inspectors for the purpose of locating defects in the glass, but such visual inspection is expensive and it does not disclose the very small defects which permit leakage of thin fluid from the containers. As a consequence, even after bottles have been carefully inspected in accordance with this ordinary expensive method, they cannot be safely guaranteed as leak-proof containers for very thin fluids.

The present invention comprises an apparatus adapted to automatically handle the containers to be tested, thereby avoiding the expense of a visual inspection of each individual container. Furthermore, the testing device will detect minute defects which have heretofore escaped the observation of an inspector.

Briefly stated, the preferred form of the invention includes a spark producing device whereby an electrical spark is projected through the defects in the glass containers, so as to select the defective containers from the others. One of the sparking electrodes of an electrical sparking device is preferably located outside of and adjacent to the glass container, and the other electrode is preferably located within the container. When the electrodes are thus associated with a defective bottle, the spark tending to jump from one electrode to the other will be projected through the defect, thereby enabling the defective bottle to be distinguished from a perfect bottle. If there is no defect in the bottle, the glass being an insulator will prevent the discharge of a spark between the electrodes.

In actual practice, I have seated the bottom face of the bottle upon one electrode and inserted the other electrode into the bottle and into engagement with the bottom wall thereof. The electrodes have been thus located very close to each other with the glass bottom wall interposed between them, the object being to subject the bottom to a very severe test, for the defects are most likely to occur at this point. However, actual experience has shown that with the apparatus applied to a bottle in this manner, a spark will not only be projected through any tiny defect in the bottom wall, but it will also pass through a defect near the neck of the bottle. This, I believe, is due to the fact that a film of moisture is always present on the glass surfaces, and the electric current will flow along this moisture to pass through a defect at a point remote from the electrodes.

Furthermore, the electrical testing operation will detect unusually thin portions in the glass as well as small cracks or holes, such thin portions being broken by the force of the spark jumping from one electrode to the other.

The automatic means for separating the defective bottles from the others preferably includes a controlling device responsive to the electrical means for energizing the electrodes. When a spark jumps from one electrode to the other so as to pass through a defect, there is a resultant electrical condition which I preferably take advantage of to control a device for displacing the defective container. This condition does not occur while the perfect bottles are undergoing the test. The details of one form of this feature of the invention will be hereafter pointed out.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of a bottle-testing apparatus embodying the features of this invention.

Fig. II is a top or plan view of the apparatus.

Fig. III is a transverse section taken approximately on the line III—III, in Fig. II.

Fig. IV is a diagrammatical view illustrating the electrical elements of the testing apparatus.

As an illustration of one form of the apparatus, I have shown an endless metal band A forming one of the electrodes of the testing device, as will be hereafter described, and an ordinary rod, or wire, B forming the other electrode. The bottles, or other glass containers, are shown at C. The bottle to be tested is seated upon the metal band A and the electrode B is inserted into the bottle so as to engage the bottom wall thereof, and the electrodes A and B are thereafter energized for the purpose of testing the bottles. If a bottle is defective, a spark will jump from one electrode to the other and through the defect in the bottle, with the result of producing an electrical condition which does not occur when a satisfactory bottle is undergoing the test.

The endless metal band A which forms one of the electrodes is mounted upon a drive pulley 1 and an idle pulley 2. The pulley 1 is made of metal and fixed to a shaft 3 mounted in metal bearings 4. As shown by Fig. I, a wire 5 is connected to one of the bearings 4 to provide for the transmission of current through said bearings 4 to provide for the transmission of current through said bearing and also through the shaft 3 and pulley 1 to the endless metal band A. The band A is thus electrically connected to the wire 5, which is energized through the medium of a spark coil, as will be hereafter described. The vertically movable electrode B is connected to a wire 6, and this wire is also connected to the spark coil.

The idle pulley 2, at the left side of Figs. I and II, is mounted in bearings 7 which may be adjusted through the medium of screws 8 to tighten the band A. This band may be driven continuously through the medium of a sprocket wheel 9 on the shaft 3, a sprocket chain 10 leading from said wheel 9 to a smaller sprocket 11, the latter being fixed to a shaft 12 and provided with a gear wheel 13 meshing with a pinion 14 on the shaft of a constantly running motor 15. The bottles are delivered to the endless band A at a point near the right hand end of Figs. I and II, and they travel between stationary guide members 16 and 17. The bottle being tested eventually engages a stationary stop member near the left hand end of the guideway between the bars 16 and 17. When a bottle engages this stationary stop member, it is arrested, or stopped, although the band A continues in motion. When a bottle engages this stop member it is in alinement with the electrode B, and this electrode moves into and out of the bottle, as will be hereafter described.

After a bottle has been tested, it is displaced from the stationary stop member 18 and permitted to continue in motion with the constantly traveling band A. The means for displacing the tested bottles comprises a pusher arm 19 rigidly secured to the upper end of a lever 20, the latter being pivotally supported at 21. The extreme positions of this lever 20 and pusher arm 19 are shown by dotted lines in Fig. III, and it will be readily understood that these elements can be moved about the axis of pivot 21 to displace the bottle C from the position shown by full lines in Fig. III to the position shown by dotted lines. When a bottle is shifted to the position shown by dotted lines in Fig. III, it is in alinement with a guideway between stationary plates 22 and 23, and it can then travel with the band A so as to pass between these plates, as indicated by the arrows shown by full lines in Fig. II. The bottles that have withstood the test are thus carried away between the guideplates 22 and 23.

The means for operating the pusher arm 19 includes a constantly running motor 24 provided with a pinion 25 meshing with a gear wheel 26. A connecting rod 27 (Fig. III) is pivoted to a crank pin 28 on the constantly running gear wheel 26, and this rod is also pivoted at 29 to the lever 20. By means of the elements just described, the pusher arm 19 and lever 20 are constantly oscillated about the axis of pivot 21. While the pusher arm 19 is entirely beyond the path of the bottles, the electrode B is moved into and out of the bottle to be tested.

The lower portion of electrode B (Figs. I and III) projects from an insulating tube 30, preferably made of glass and rigidly secured to a pair of arms 31 extending from and rigidly secured to a vertical rod 32, said rod being mounted in suitable guides 33. As shown by Fig. I, a compression spring 34 is interposed between one of the guides 33 and a collar 35 on the rod 32. This spring 34 tends to move the rod 32 in a downward direction, thereby tending to move the electrode B into the bottle to be tested.

The means for elevating the rod 32 and the electrode B comprises a lever 36 pivotally supported at one end as shown at 37 in Fig. III, and having a slot at the opposite end adapted to receive a pin 38 projecting from the vertical rod 32. The constantly running gear wheel 26 is suitably connected to a disk 39 provided with a crank pin 40, which engages the lower edge of lever 36. The spring 34 (Fig. I) tends to force rod 32 downwardly, and the motion of this rod is controlled by the lever 36 and the crank pin 40 engaging said lever. When the crank pin 40 moves downwardly from the position shown in Fig. III, the rod 32 and electrode B will move downwardly with the result of inserting the electrode into the bottle. Thereafter, when the crank pin 40 moves upwardly, an upward motion will be imparted to the lever 36 and vertical rod 32, so as to withdraw the electrode from the bottle.

In Fig. I, at the upper portion thereof, I have shown a stationary contact member 41 adapted to be engaged by a contact member 42 on the vertically movable rod 32. When the electrode B is lowered into the bottle, the contact member 42 engages the stationary contact member 41 so as to complete an electrical circuit whereby the electrodes are energized, as will be presently described.

This circuit is shown in Fig. IV. It comprises a conductor 43 leading from a main conductor 44 to a primary coil 45, a conductor 46 leading from the primary coil to the contact member 42, a conductor 47 leading from the contact member 41 to an electro-magnet 48, and a conductor 49 leading from said electro-magnet to a main conductor 50. Through this circuit an alternating current may be conducted from the main wires 44 and 50 to the primary coil 45. This primary coil is associated with a secondary coil 51 to produce a transformer commonly termed a "spark coil," and the wires 5 and 6 are connected to the secondary coil, the wire 6 being connected to the electrode B, and the wire 5 being electrically connected to the electrode A, as previously pointed out. The wire 5 is grounded, as shown at the right-hand end of Fig. I, and as suggested by the diagrammatical ground A' in Fig. IV. When the electrode B is inserted into the bottle C, the contact member 42 engages the stationary contact 41 to provide for the transmission of current through the spark coil, and if the bottle is defective, a spark will jump through the defect, as previously pointed out.

I will now describe a means for separating the defective bottles from the others. As shown most clearly by Figs. I and II, 52 designates a deflector wing forming a continuation of the stationary guideplate 23, said deflector wing 52 being rigidly secured to a vertical shaft 53 rotatably supported by the guideplate 23. A torsional spring 54 (Fig. I) surrounding the vertical shaft 53 has one of its ends extended to engage the stationary guideplate 23 and its other end extended to engage the pivotally supported deflector 52. This spring 54 constantly tends to move the deflector 52 from the position shown by full lines in Fig. II to the position shown by dotted lines. In Figs. II, III and IV I have shown a solenoid 55 provided with a movable core 56. One side of this core 56 is normally engaged by the deflector 52, as shown in Fig. III, and the other side of said core is beveled. This solenoid core normally retains the deflector 52 in the position shown by full lines in Figs. II and III, but when the solenoid 55 is energized, the core 56 will be drawn upwardly so as to release the deflector 52, thereby permitting the spring 54 to shift said deflector to the position shown by dotted lines in Fig. II. When the solenoid 55 is deenergized, the core 56 will occupy the position shown by Figs. III and IV, and if the deflector 52 is then forced from the position shown by dotted lines in Fig. II to the position shown by full lines, the upper edge of the deflector will engage the inclined face of core 56 so as to elevate the core, and after the deflector has passed this core the latter will drop by gravity to its normal position so as to lock the deflector in the position shown by full lines.

The means for energizing the solenoid 55 comprises a main conductor 57 (Fig. IV), a a conductor 58 leading from the conductor 57 to the solenoid, a conductor 59 leading from the solenoid to an armature 60, and a conductor 61 leading from a point near the armature 60 to the other main conductor 62. The armature 60 is adapted to be attracted by the electro-magnet 48 (Fig. IV), and a light spring 63 tends to move said armature 60 away from the electro-magnet. When this magnet is sufficiently energized, it will move the armature 60 into engagement with the adjacent contact member at the end of conductor 61, thereby completing the circuit including solenoid 55, so as to elevate the solenoid core 56 and thereby release the spring-actuated deflector 52, permitting the spring to throw said deflector to the position shown by dotted lines in Fig. II. The armature 60 is normally held in the position shown by Fig. IV, so the solenoid circuit is normally open. The intensity of the current transmitted through magnet 48 and primary coil 45 depends to a certain extent upon the conditions in the secondary circuit including the secondary coil 51. When a perfect bottle is interposed between the sparking electrodes A and B, these electrodes will be effectively insulated from each other so as to prevent transmission of current through the secondary circuit. However, when a spark jumps through a defect in a bottle, the secondary circuit is energized, and there is a resultant increase of current transmitted through the primary circuit including the primary coil 45 and the electro-magnet 48. Therefore, when a perfect bottle is undergoing the electrical test, a comparatively weak current will flow through the electro-magnet 48, but the spring 63 will then prevent the armature 60 from moving toward the magnet. When a spark is permitted to jump across the gap in the secondary circuit, current will be transmitted through this spark, and as a result of this transmission of electrical energy from the primary coil, a comparatively strong current will be transmitted through the primary circuit, and the magnetic force at the magnet 48 will move the armature 60 into engagement with the adjacent end of conductor 61, thereby completing the solenoid circuit to elevate the solenoid core 56.

From the foregoing it will be understood that the solenoid 55 is not energized when a perfect bottle is undergoing the test, and that the solenoid circuit is energized when a spark jumps through a defect in a bottle. As a consequence, the spring-actuated deflector is normally held in the position shown by full lines in Fig. II, and the bottles that have satisfactorily withstood the test travel between the guide members 22 and 23. When a defective bottle is tested, the solenoid 55 is energized to release the spring-actuated deflector plate 52, and thereafter the pusher arm 19 is actuated to shift the defective bottle to a position in alinement with the guideway between the guide plates 22 and 23. At this time the guideway is closed by the deflector plate 52 which then occupies the position shown by dotted lines in Fig. II, so the defective bottle moving with the endless band A will strike the deflector 52 and travel as indicated by dotted arrows in Fig. II. The defective bottles are thus separated from the others.

I will now describe a suitable means for restoring the deflector plate 52 after it has been shifted to the position shown by dotted lines in Fig. II. This deflector plate is rigidly secured to the vertical shaft 53 whereby it is pivotally supported, and an operating crank 64 is also rigidly secured to this vertical shaft. A link 65 connects the crank 64 to an operating arm 66 fixed to a vertical shaft 67 provided at its lower end with an operating arm 68, which extends to a point near the bottle pushing arm 19. This arm 19 carries a spring-actuated dog 69 (Fig. II) in the form of a bell crank lever pivotally supported by the arm 19 and having a tail adapted to engage and travel along a stationary plate 70. In Fig. II I have shown a stop member 71 adapted to limit the motion of the spring-actuated dog 69. When the parts occupy the position shown by Fig. II, the dog 69 engages the stationary bar 70 and it is separated from the operating arm 68. However, when the pusher arm 19 is moved forwardly from the position shown in Fig. II, it will be disengaged from the bar 70 and its spring will engage it with the stop 71 carried by the pusher arm. The dog 69 will then lie in the path of operating arm 68.

The operation of the elements just described is as follows: When the deflector 52 is shifted to the position shown by dotted lines in Fig. II, the operating arm 68 is displaced to the position shown by dotted lines. The pusher arm 19 is then engaged with the bottle to displace it from the stationary stop 18, and the traveling band A then moves the bottle along the deflector, as previously pointed out. When the pusher arm 19 is restored, the dog 69 carried by said arm engages the operating arm 68, with the result of moving the same from the position shown by dotted lines in Fig. II to the position shown by full lines, thereby restoring the deflector 52. As the pusher arm 19 continues in motion, the dog 69 engages the stationary plate 70 (Fig. II) and this releases the dog from the operating arm 68 after the deflector has been restored. After this occurs, the pusher arm 19 moves idly to the position shown by dotted lines at the extreme left side of Fig. II, and during this idle motion the dog 69 (Fig. II) is retained in engagement with the stationary bar 70. During the next forward stroke of the pusher arm 19, the dog 69 merely snaps over the end of operating arm 68, and after the bottle-pushing arm 19 has shifted the bottle, said arm 19 is restored, and when it reaches the position shown by Fig. II, the dog 69 engages the stationary bar 70, whereby the dog is displaced from the operating arm 68.

When a perfect bottle is tested, the operating arm 68 remains in the position shown by full lines in Fig. II, and it is not in any way affected by the dog 69, but when a defective bottle is tested, the deflector 52 and its operating arm 68 are shifted to the positions shown by dotted lines in Fig. II, and thereafter the dog 69 restores the operating arm and deflector to the positions shown by full lines in Fig. II.

From the foregoing it will be observed that the invention herein disclosed comprises a simple electrical apparatus whereby the bottles are effectively tested to locate minute defects which would escape the observation of an inspector. In addition to this, I have shown an automatic means for carrying the bottles to a testing station, where they are successively tested and then carried away from the testing station. I have also disclosed an automatic means for separating the defective bottles from the others.

I claim:

1. An apparatus for testing glass containers comprising an upper electrode, a carrier adapted to carry a glass container to a position adjacent said upper electrode, said carrier being provided with a lower electrode adapted to engage the glass container, and means whereby a spark is caused to jump from one of said electrodes to the other.

2. An apparatus for testing glass containers comprising an electrode, a carrier adapted to convey a plurality of glass containers toward said electrode, said carrier being provided with an electrode, means whereby each of said glass containers is arrested adjacent to the first mentioned electrode, and means whereby a spark is caused to jump from one electrode to the other.

3. An apparatus for testing glass containers comprising a movable electrode, a second electrode comprising a conveyor upon which a plurality of glass containers are moved toward the first mentioned electrode, means whereby each of said glass containers is arrested adjacent said first mentioned electrode, means for moving said first mentioned electrode into and out of the arrested containers, and means whereby a spark is caused to jump from one of said electrodes to the other.

4. An apparatus for testing glass containers comprising an electrode, a second electrode comprising a metallic carrier forming seats for the glass containers, said metallic carrier being adapted to carry a plurality of glass containers toward the first mentioned electrode, and means whereby a spark is caused to jump from one electrode to the other, the last mentioned means including a conductor electrically connected to the first mentioned electrode and a conductor electrically connected to said metallic carrier.

5. An apparatus for testing glass containers comprising a movable electrode, a second electrode adapted to convey a plurality of glass containers toward the position of the first mentioned electrode, means whereby each of said glass containers is arrested adjacent said first mentioned electrode, means for moving said first mentioned electrode to a position within said arrested container comprising a vertically movable rod to which said electrode is secured and means for operating said vertically movable rod, and means whereby a spark is caused to jump from one electrode to the other.

6. An apparatus for testing glass containers comprising a movable electrode, a second electrode adapted to convey a plurality of glass containers toward the first mentioned electrode, means whereby each of said glass containers is arrested adjacent said first mentioned electrode, means for moving said first mentioned electrode to a position within said arrested container comprising a vertically movable rod to which said electrode is secured, a spring connected to said vertically movable rod whereby said rod is moved downwardly, means for moving said vertically movable rod upwardly against the action of said spring, and means whereby a spark is caused to jump from one electrode to the other.

7. An apparatus for testing glass containers comprising a movable electrode, a second electrode adapted to convey a plurality of glass containers toward the position of the first mentioned electrode, means whereby the movement of each of said glass containers is arrested adjacent said first mentioned electrode, means for moving said first mentioned electrode to a position within said arrested container comprising a vertically movable rod to which said electrode is secured, a spring connected to said vertically movable rod whereby said rod is drawn downwardly, a pivoted arm pivotally attached to said vertically movable rod, a rotary member adjacent said pivoted arm and an operating member secured to said rotary member and adapted to engage said pivoted arm to raise same, and means whereby a spark is caused to jump from one electrode to the other.

8. An apparatus for testing glass containers comprising a movable electrode, a second electrode adapted to convey a plurality of glass containers toward the first mentioned electrode, means whereby each of said glass containers is arrested adjacent said first mentioned electrode, means for moving said first mentioned electrode into the arrested containers, means whereby a spark is caused to jump from one electrode to the other, and means for moving said second electrode to carry the containers away from the first mentioned electrode.

9. An apparatus for testing glass containers comprising a movable electrode, a second electrode adapted to convey a plurality of glass containers toward the position of the first mentioned electrode, means whereby each of said glass containers is arrested adjacent said first mentioned electrode, means for moving said first mentioned electrode to a position within said arrested container, means whereby a spark is caused to jump from one electrode to the other, and means for moving the containers away from the position of the first mentioned electrode comprising a pivoted arm adapted to move against said arrested container and means whereby said pivoted arm is operated.

10. An apparatus for testing glass containers comprising a movable electrode, a second electrode adapted to convey a plurality of glass containers toward the position of the first mentioned electrode, means whereby each of said glass containers is arrested adjacent said first mentioned electrode, means for moving said first mentioned electrode to a position within the arrested container, means whereby a spark is caused to jump from one electrode to the other, and means for moving the containers away from the position of the first mentioned electrode comprising a pivoted member adapted to engage the arrested container, a rotary operating member, and a connecting rod one end of which is pivotally connected to said pivoted member and the other end thereof pivotally connected to said rotary member.

11. An apparatus for testing glass containers comprising an electrode, a second electrode adapted to support a plurality of glass containers, means whereby said second electrode is moved to carry the containers to a point adjacent to the first mentioned electrode, means whereby a spark is caused to jump from one electrode to the other, and means whereby the defective containers are separated from the others.

12. An apparatus for testing glass containers comprising a movable electrode, a second electrode adapted to carry a plurality of glass containers toward the first mentioned electrode, means whereby said glass containers are successively arrested adjacent said first mentioned electrode, means for moving said first mentioned electrode into the arrested container, means whereby a spark is caused to jump from one electrode to the other, and means whereby the defective containers are separated from the others.

13. An apparatus for testing glass containers comprising a movable electrode, a second electrode adapted to carry a plurality of glass containers toward the first mentioned electrode, means whereby said glass containers are successively arrested adjacent said first mentioned electrode, means for moving said first mentioned electrode to a position within the arrested container, means whereby a spark is caused to jump from one electrode to the other, means for moving said containers away from the first mentioned electrode, and means whereby the defective containers are separated from the others.

14. An apparatus for testing glass containers comprising an electrode, a second electrode adapted to carry a plurality of glass containers toward the first mentioned electrode, means whereby a spark is caused to jump from one electrode to the other, and a deflector for separating the defective containers from the other.

15. An apparatus for testing glass containers comprising an electrode, a second electrode adapted to carry a plurality of glass containers toward the first mentioned electrode, means whereby a spark is caused to jump from one electrode to the other, said second electrode being movable to carry the containers away from the first mentioned electrode, and a hinged deflector for separating the defective containers from the others.

16. An apparatus for testing glass containers comprising a movable electrode, a second electrode adapted to carry a plurality of glass containers toward the first mentioned electrode, means whereby said glass containers are successively arrested adjacent said first mentioned electrode, means for moving said first mentioned electrode to a position within the arrested container, means whereby a spark is caused to jump from one electrode to the other, means for moving the containers away from the first mentioned electrode, and automatic means whereby the defective containers are separated from the others, said automatic means comprising a hinged deflector and means whereby said deflector is shifted into the course of the defective containers.

17. An apparatus for testing glass containers comprising a pair of electrodes separated from each other to receive a container between them, electrical means whereby a spark is caused to jump from one of said electrodes to the other, and automatic means whereby the defective containers are separated from the others, said automatic means including a device for displacing the defective containers, operating means for said device, and an electrically actuated controller for said operating means, said controller being responsive to said electrical means.

18. An apparatus for testing glass containers comprising a pair of electrodes separated from each other to receive a container between them, means whereby one of said electrodes is located within the container and adjacent to the other electrode, electrical means whereby a spark is caused to jump from one of said electrodes to the other, and automatic means for separating the defective containers from the others, said automatic means comprising a controller including an electro-magnet responsive to said electrical means.

19. An apparatus for testing glass containers comprising a pair of electrodes separated from each other to receive a container between them, means whereby one of said electrodes is located within the container and adjacent to the other electrode, electrical means whereby a spark is caused to jump from one of said electrodes to the other, and automatic means for separating the defective containers from the others, said automatic means including a device for displacing the defective containers and a controller for said device comprising an electro-magnet responsive to said electrical means.

20. An apparatus for testing glass containers comprising a pair of electrodes separated from each other to receive a container between them, electrical means whereby a spark is caused to jump from one of said electrodes to the other, and automatic means for separating the defective containers from the others, said automatic means comprising an electro-magnet energized by said electrical means, a second electro-magnet, a circuit for energizing said second electro-magnet, said circuit including a switch controlled by the first mentioned electro-magnet, and a device for displacing the defective containers controlled by said second electro-magnet.

In testimony that I claim the foregoing I hereunto affix my signature.

OLIVER C. K. HUTCHINSON.